United States Patent
Schumann

(10) Patent No.: US 11,067,783 B2
(45) Date of Patent: Jul. 20, 2021

(54) LIGHT SHEET MICROSCOPE AND METHOD FOR IMAGING A SAMPLE BY LIGHT SHEET MICROSCOPY

(71) Applicant: Leica Microsystems CMS GmbH, Wetzlar (DE)

(72) Inventor: Christian Schumann, Lich (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 3 days.

(21) Appl. No.: 16/078,024

(22) PCT Filed: Feb. 21, 2017

(86) PCT No.: PCT/EP2017/053890
§ 371 (c)(1),
(2) Date: Aug. 21, 2018

(87) PCT Pub. No.: WO2017/144442
PCT Pub. Date: Aug. 31, 2017

(65) Prior Publication Data
US 2019/0049711 A1    Feb. 14, 2019

(30) Foreign Application Priority Data
Feb. 23, 2016    (DE) ............... DE10 2016 103 182.8

(51) Int. Cl.
*G02B 21/16*    (2006.01)
*G02B 21/06*    (2006.01)
(Continued)

(52) U.S. Cl.
CPC ........... *G02B 21/16* (2013.01); *G02B 21/002* (2013.01); *G02B 21/06* (2013.01); *G02B 21/367* (2013.01)

(58) Field of Classification Search
CPC .. G02B 21/16; G02B 21/0076; G02B 21/002; G02B 21/06; G02B 21/0032; G02B 21/0024; G02B 13/22
See application file for complete search history.

(56) References Cited

U.S. PATENT DOCUMENTS 5,192,980 A * 3/1993 Dixon ...................... G01J 3/30
                                                     250/458.1
5,381,224 A * 1/1995 Dixon ................ G01N 21/6456
                                                     250/458.1
(Continued)

FOREIGN PATENT DOCUMENTS

DE    102013105586 A1   12/2014
JP       2016001274 A    1/2016
WO    WO 2015109323 A2   7/2015

OTHER PUBLICATIONS

Sunil Kumar et al: "High-speed 2D and 3D fluorescence microscopy of cardiac myocytes References and links, Am. J. Physiol. Circ. Res. Proc. Natl. Acad. Sci. U.S.A. Circ. Res. Circ. Res. Proc. Natl. Acad. Sci. U.S.A. J. Biomed. Opt. Biophys. J. Ann. Phys. Science Development ScienceFast" Opt. Express E. J. Botcherby, Opt. Lett. Opt. Commun. Opt. Letter, Jan. 1, 1999 (Jan. 1, 1999), pp. 575-585, XP055327152.

(Continued)

*Primary Examiner* — Christopher Stanford
(74) *Attorney, Agent, or Firm* — Leydig, Voit & Mayer, Ltd.

(57) ABSTRACT

A light sheet microscope includes an illumination optical system configured to generate a light sheet in an intermediate image space. A transport optical system, which is telecentric on both sides, is configured to image the light sheet generated in the intermediate image space into a sample and to image a region of the sample illuminated by the light sheet as an intermediate image into the intermediate (Continued)

image space. A detection optical system is configured to image the intermediate image generated in the intermediate image space onto a detector. The optical axes of the illumination optical system, the transport optical system and the detection optical system intersect one another in the intermediate image space. The microscope further includes a scanning element, which is arranged in the transport optical system and through which the light sheet is moveable in the sample transversely to the optical axis of the transport optical system.

20 Claims, 3 Drawing Sheets

(51) Int. Cl.
G02B 21/00 (2006.01)
G02B 21/36 (2006.01)

(56) References Cited

U.S. PATENT DOCUMENTS

| | | | | |
|---|---|---|---|---|
| 5,532,873 | A * | 7/1996 | Dixon | G02B 21/0044 359/368 |
| 5,734,478 | A * | 3/1998 | Magome | G03F 9/7049 250/548 |
| 5,737,121 | A * | 4/1998 | Dixon | G02B 21/0044 359/368 |
| 5,760,951 | A * | 6/1998 | Dixon | G02B 21/002 359/368 |
| 6,778,267 | B2 * | 8/2004 | Drake | G01N 21/47 356/237.1 |
| 7,218,446 | B2 * | 5/2007 | Dixon | G02B 21/0024 359/368 |
| 8,254,023 | B2 * | 8/2012 | Watson | G02B 27/0075 359/432 |
| 8,582,203 | B2 | 11/2013 | Dunsby et al. | |
| 8,619,237 | B2 | 12/2013 | Hillman et al. | |
| 8,730,583 | B2 | 5/2014 | Schek | |
| 2002/0145734 | A1 * | 10/2002 | Watkins | G01N 21/8806 356/237.2 |
| 2002/0148984 | A1 * | 10/2002 | Watkins | G01N 21/9501 250/559.45 |
| 2003/0027367 | A1 * | 2/2003 | Watkins | G01N 21/9501 438/16 |
| 2008/0218849 | A1 * | 9/2008 | Uhl | G02B 21/0032 359/368 |
| 2014/0184777 | A1 * | 7/2014 | Kleppe | G01N 21/6458 348/79 |
| 2015/0323774 | A1 | 11/2015 | Lippert et al. | |
| 2016/0131884 | A1 | 5/2016 | Singer et al. | |

OTHER PUBLICATIONS

Botcherby E J et al: "Aberration-Free Optical Refocusing in High Numerical Aperture Microscopy", Optics Letters, Optical Society of America, vol. 32, No. 14, Jul. 15, 2007 (Jul. 15, 2007), pp. 2007-2009, XP001506742.

Matthew B. Bouchard, et al., "Swept confocally-aligned planar excitation (SCAPE) microscopy for high-speed volumetric imaging of behaving organisms", Nature Photonics, vol. 9, Feb. 2015, pp. 113-119.

Kumar, Sunil et al. "High-speed 2D and 3D fluorescence microscopy of cardiac myocytes," Optics Express, vol. 19, No. 15, pp. 13839-13847, Jul. 6, 2011.

* cited by examiner

LIGHT SHEET MICROSCOPE AND METHOD FOR IMAGING A SAMPLE BY LIGHT SHEET MICROSCOPY

CROSS-REFERENCE TO PRIOR APPLICATIONS

This application is a U.S. National Stage Application under 35 U.S.C. § 371 of International Application No. PCT/EP2017/053890 filed on Feb. 21, 2017, and claims benefit to German Patent Application No. DE 10 2016 103 182.8 filed on Feb. 23, 2016. The International Application was published in German on Aug. 31, 2017 as WO 2017/144442 A1 under PCT Article 21(2).

FIELD

The invention relates to a light sheet microscope, comprising an illumination optical system for generating a light sheet in an intermediate image space, a transport optical system, which is telecentric on both sides, for imaging the light sheet generated in the intermediate image plane into a sample and for imaging a region of the sample illuminated by the light sheet as an intermediate image into the intermediate image space, and a detection optical system for imaging the intermediate image generated in the intermediate image space onto a detector, the optical axes of the illumination optical system, the transport optical system and the detection optical system intersecting one another in the intermediate image space.

BACKGROUND

Conventional light sheet microscopes have two separate objectives on the sample side, one of which is used for illumination and the other is used for detection. By means of the illumination objective, a light sheet oriented in parallel with the optical axis is typically focused into the sample, which light sheet is then imaged onto a detector by the detection objective, the optical axis of which is positioned at a right angle to the optical axis of the illumination objective. For applications in which a lack of space does not allow the sample to be imaged by means of such a light sheet microscope provided with two separate objectives, U.S. Pat. No. 8,582,203 B2 proposed a microscope that requires just a single objective on the sample side. In this microscope, the light sheet is focused into the sample such that said light sheet is positioned obliquely to the optical axis of the objective. On account of this oblique position, a microscope of this kind is also referred to as an "oblique plane microscope" (OPM).

Since the oblique plane microscope known from the prior art comprises just a single sample-facing objective, said microscope allows access to fluorescence-based microscopic light sheet imaging in samples that are not possible to image by means of a conventional light sheet microscope having two objectives. As an essential component, said microscope includes a "transport optical system", which is used for volume imaging. Said transport optical system is a 4f system or an imaging system that is telecentric on both sides, the magnification of which has to correspond to the refractive index ratio between the sample space and intermediate image space in order to also ensure correct imaging of the aperture angle. If the requirements of two-sided telecentricity and the mentioned magnification adjustment are fulfilled, it is possible for a volume image to be transported, so to speak, between the sample space and the intermediate image space. By contrast, in a conventional microscope, in which one of the two above-mentioned requirements is not fulfilled, only one plane image is transported.

Kumar et al., Optics Express 19 (2011), 13839-13847 (FIG. 1) discloses a light sheet microscope that comprises an illumination optical system, a transport optical system of the type described above, and a detection optical system, the optical axes of which converge in the intermediate image space. One of the objectives included in the transport optical system can be axially moved for focusing and volume image capture. Alternatively, the sample may also be moved along the optical axis of the transport optical system. The drawback to this known arrangement is therefore the movement of relatively large masses in the form of the objective and/or the sample, as a result of which vibrations may occur and which allow only a low volume image rate.

U.S. Pat. No. 8,619,237 B2 discloses a variation of an oblique plane microscope that allows the volume to be laterally scanned by means of two deflection elements, one of which is associated with the illumination light sheet and the other is associated with the imaging plane. The two deflection elements are formed on a polygon mirror and are therefore geometrically coupled to one another. The arrangement of the deflection element is therefore not telecentric. Said arrangement also only allows half the system pupil to be used for imaging. This causes geometric distortions and restricts the light efficiency of the system. Furthermore, a polygon mirror is expensive and complex to produce and has a relatively large moment of inertia, which restricts the volume image rate of the system.

Bouchard et al., Nature Photonics 9 (2015), 113-119 (FIG. 5 in the supplement) discloses a modification to the above-mentioned system, in which the whole pupil can be used. For this purpose, however, two galvanometer systems that have to be synchronized are needed. Furthermore, this modified system requires a plurality of optical assemblies.

WO 2015/109 323 A2 (FIG. 10) discloses a lateral-scanning oblique plane microscope that requires just a single scanning element. In this microscope, however, the illumination light and detection light are combined and separated by means of a dichroic beam splitter included in the transport optical system. The drawback to a beam splitter of this kind is that it causes, in the transport optical system, pupil offset that may be of such a degree that the transport optical system no longer ensures the necessary volume imaging. In order to minimize the pupil offset and also allow the necessary transmission through the beam splitter substrate, the dichroic beam splitter should be as thin as possible. Since a beam splitter of this kind is often a layer system having a relatively complicated structure, there is the risk, in the case of a particularly thin design, of distortions that are seen as astigmatic aberrations of the imaging in reflection.

SUMMARY

In an embodiment, the present invention provides a light sheet microscope including an illumination optical system configured to generate a light sheet in an intermediate image space. A transport optical system, which is telecentric on both sides, is configured to image the light sheet generated in the intermediate image space into a sample and to image a region of the sample illuminated by the light sheet as an intermediate image into the intermediate image space. A detection optical system is configured to image the intermediate image generated in the intermediate image space onto a detector. The optical axes of the illumination optical system, the transport optical system and the detection optical system intersect one another in the intermediate image space. The microscope further includes a scanning element, which is arranged in the transport optical system and through which the light sheet is moveable in the sample transversely to the optical axis of the transport optical system.

BRIEF DESCRIPTION OF THE DRAWINGS

The present invention will be described in even greater detail below based on the exemplary schematic figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
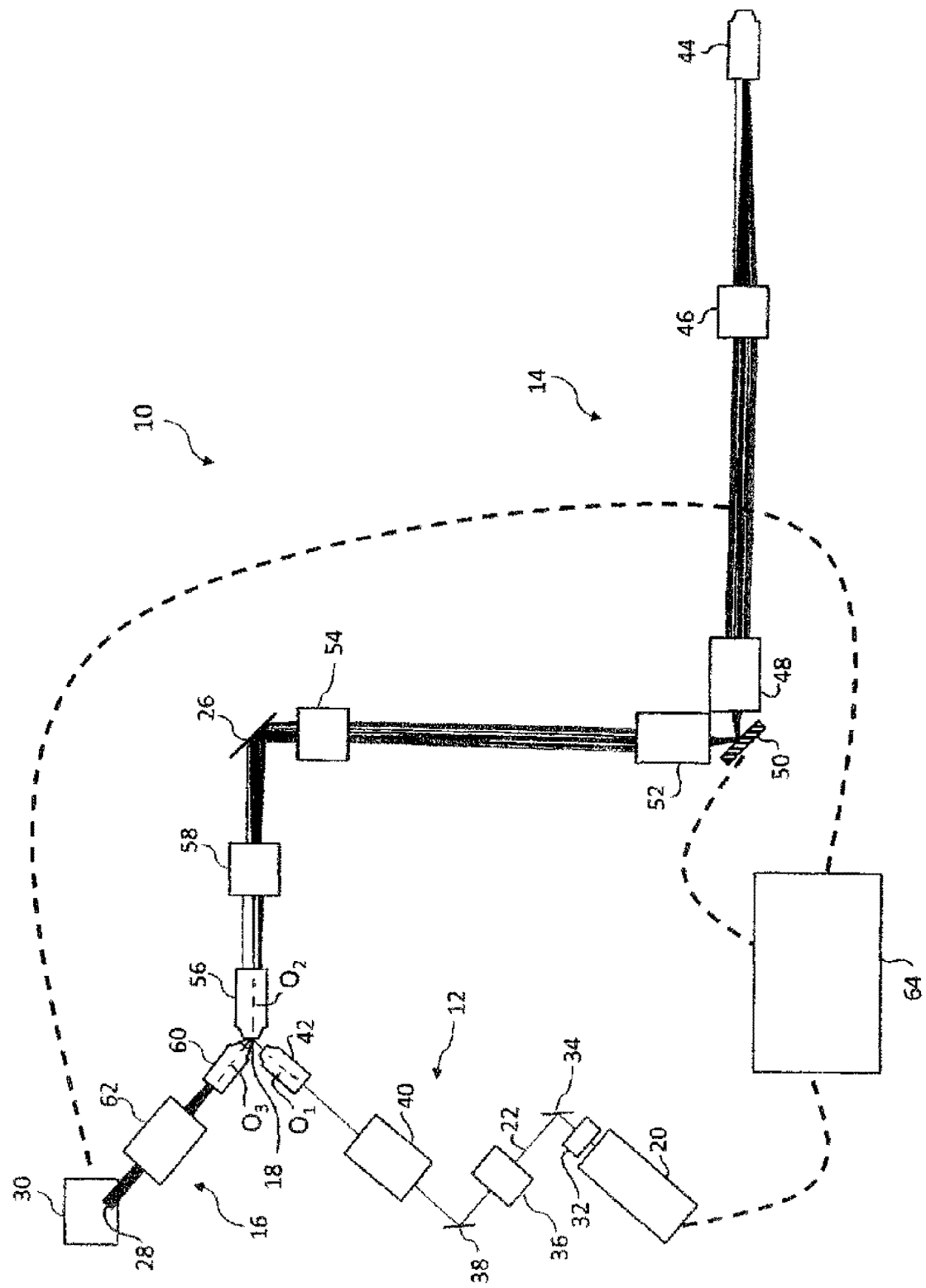
FIG. 1 shows the schematic structure of a light sheet microscope as a first embodiment.

Embodiments of the invention provide a light sheet microscope and a method for light-microscopy imaging of a sample, which allow efficient volume imaging to a relatively low degree of technical complexity.

The light sheet microscope according to an embodiment of the invention comprises an illumination optical system for generating a light sheet in an intermediate image space, a transport optical system, which is telecentric on both sides, for imaging the light sheet generated in the intermediate image plane into a sample and for imaging a region of the sample illuminated by the light sheet as an intermediate image into the intermediate image space, and a detection optical system for imaging the intermediate image generated in the intermediate image space onto a detector. The optical axes of the illumination optical system, the transport optical system and the detection optical system intersect one another in the intermediate image space. A scanning element is arranged in the transport optical system, by means of which element the light sheet can be moved in the sample transversely to the optical axis of the transport optical system.

The transport optical system according to an embodiment of the invention is an intermediate imaging system that has the properties necessary for the volume imaging, specifically magnification that corresponds to the refractive index ratio between the sample space and the intermediate image space in order to ensure correct imaging of the aperture angle, and telecentricity on both sides, i.e. on both the object side and the image side, i.e. lateral magnification that is independent of the position along the optical axis.

The use of a transport optical system that is telecentric on both sides and a telecentric scanning arrangement that is thus made possible has, inter alia, the advantage over conventional light sheet microscopes of which the intermediate imaging optical systems are not telecentric on both sides that no distortions are caused in the transport optical system.

An embodiment of the invention provides that a single scanning element is preferably provided in the transport optical system, which element can move the light sheet in the sample transversely to the optical axis of the transport optical system. An embodiment of the invention therefore allows lateral scanning, which makes volume imaging easier. In particular in comparison with conventional light sheet microscopes in which, for volume image capture, an objective or the sample, and thus a relatively large mass, is moved along the optical axis, the microscope according to an embodiment of the invention has the advantage of vibration-free image capture. A higher volume image rate can also be achieved.

Since, in the transport optical system according to an embodiment of the invention, just a single scanning element, for example in the form of a galvanometer mirror or a micro-electromechanical mirror, MEMS mirror for short, is needed for the purposes of lateral scanning, no complex synchronization is required and a telecentric scanning process is possible without added complexity, in contrast with known microscopes that work with two scanning elements. The light sheet microscope according to an embodiment of the invention therefore requires a smaller number of optical components than comparable microscopes from the prior art. This makes it easier and more cost-effective to technically implement the microscope. This also applies in particular in comparison with conventional systems in which relatively expensive polygon mirrors are used.

In the light sheet microscope according to an embodiment of the invention, the illumination optical system, the transport optical system and the detection optical system are matched to one another such that the optical axes thereof converge, i.e. intersect one another, in the intermediate image space. The illumination light is thus coupled in the region of the intermediate image generated in the intermediate image space. This makes it possible to dispense with dichroic elements in the region of the transport optical system that are used in known light sheet microscopes to combine and separate illumination light and detection light. Since dichroic elements of this kind often cause significant pupil offset and the transport optical system is relatively sensitive to pupil offset of this kind, the absence of dichroic elements in an embodiment of the invention facilitates precise transportation of the volume image between the sample space and the intermediate image space. This makes it possible, for example, to dispense with highly precise changeover strategies for dichroic beam splitters, which allow the beam splitter to be adapted to the experiment in question and are expensive and complex to implement in terms of the required precision. Furthermore, the use of dichroic beam splitters is also compromise-ridden for multi-wavelength imaging. This therefore often leads to crosstalk of the spectral channels, for example. By contrast, the use of neutral splitters and polarization splitters is not suitable for fluorescence imaging.

On account of the geometric combination of illumination light and emission light according to an embodiment of the invention in the region of the intermediate image at the interface of the optical axes of the illumination optical system, the transport optical system and the detection optical system and on account of the absence of dichroic elements in the transport beam path, as is made possible by this combination, it is possible to avoid the above-described drawbacks. An embodiment of the invention therefore provides the light sheet to be generated in the intermediate image space by means of the illumination optical system. The detection optical system has the function of imaging the intermediate image generated in the intermediate image space onto the detector. Therefore, the illumination optical system and the detection optical system in themselves already form a microscope unit of which the beam paths merely have to be transported by the transport optical system into the sample, so to speak. In other words, this microscope unit can already be considered to be an independent light sheet microscope that merely has to be coupled to the transport optical system. The arrangement according to an embodiment of the invention is therefore less sensitive to tolerance and adjustment than systems that work with beam splitters, or the like, so as to first assemble the partial systems to form a fully functional microscope. This is all the more true in that, in the above-described partial systems, differences in the aberrations often arise, which have to be compensated for by means of suitable precautionary measures or even tolerated.

The transport optical system is preferably designed to position the light sheet in the sample obliquely to the optical axis of the transport optical system. The light sheet microscope according to an embodiment of the invention thus forms a highly efficient oblique plane microscope.

For the above-described reasons, the transport optical system is free of beam splitters in a preferred embodiment. In particular, said transport optical system does not comprise a dichroic beam splitter for coupling the illumination light.

The scanning element is preferably arranged within the transport optical system at the location of an actual pupil image, i.e. in the Fourier plane. As a system that is telecentric on both sides, the transport optical system comprises just a single pupil.

The transport optical system preferably includes a first objective, which forms the only sample-facing objective of the light sheet microscope.

In an advantageous embodiment, the transport optical system further includes a first tube lens system, a first ocular lens system, a second ocular lens system, a second tube lens system, and a second objective that faces the intermediate image space, which are arranged in the indicated sequence starting from the sample. This embodiment allows a particularly compact structure of the transport system.

The scanning element is preferably arranged between the first ocular system and the second ocular system.

In a particularly preferred embodiment, the transport optical system includes an image rotation unit, by means of which the azimuth of the tilting of the light sheet in the sample relative to the optical axis of the transport optical system can be changed. An image rotation unit of this kind allows the light sheet to be easily and flexibly adjusted in the sample. Said image rotation unit may be implemented, for example, as an Abbe-König rotator that is preferably arranged in a beam path of the transport optical system.

Furthermore, the transport optical system may be designed as a correction optics system that allows adjustment to samples of different refractive indices. This can take place, for example, by using correctively adjustable objectives (e.g. known from U.S. Pat. No. 8,730,583 B2) that also allow the correction element to be adjusted by a motor. The use of correctively adjustable objectives that correct not only the spherical aberration caused by refractive index mismatching, but at the same time are designed such that, when the corrective adjustment is used, the focal distance changes in such a way that the magnification condition applicable to the transport optical system also remains fulfilled for all the sample-side refractive indices, is particularly advantageous.

In order to satisfy the above-described requirement of a magnification adjustment, it may be necessary to integrate a corresponding magnification element in the transport optical system, e.g. an afocal system that is arranged in a portion of the infinite beam path of the transport optical system.

The illumination optical system preferably includes a telescope system and an illumination objective that faces the intermediate image.

A laser light source is preferably used as a light source. The light source may, however, also be an LED or a lamp. If a laser light source is used, no excitation filter is necessary in the beam path of the illumination optical system. If, however, a light source having a wide emission spectrum is used, a filter of this kind may be necessary.

The illumination optical system preferably includes an anamorphic optical system for generating the light sheet. The anamorphic system may be implemented as a cylindrical lens in isolation or in combination with an illumination objective arranged downstream therefrom.

In an alternative embodiment, the illumination optical system includes a further scanning element, for example in the form of a galvanometer mirror or an MEMS mirror for generating the light sheet in the intermediate image space. In this embodiment, the light sheet is built up sequentially by means of the scanning movement of the illumination light beam incident on the scanning element. This type of light sheet generation offers, for example, the possibility of achieving structuring of the light sheet by means of appropriate synchronization between the light source and the scanning element.

The illumination optical system preferably includes an adjustment device for orienting the light sheet relative to a detection plane of the detector. This makes it possible to adjust the light sheet particularly easily.

The above-mentioned adjustment device preferably comprises a first adjustment element, which is arranged in a plane that is conjugate with an image plane, and a second adjustment element, which is arranged in a plane that is conjugate with a pupil plane. The position and angle of the light sheet can thus be set independently of one another.

In a preferred embodiment, at least one deflection element is provided for bending a beam path. A deflection element of this kind may be arranged, for example, in the transport optical system in order to make said system as compact as possible.

The detection optical system preferably comprises a detection objective, which faces the intermediate image space, and a tube lens system, which image the detected fluorescent light onto the detector, e.g. a camera sensor. An emission filter may be arranged in the infinite beam path between the detection objective and the tube lens system, which filter is installed either so as to be stationary or on a changeover device. This embodiment should be understood to be given merely by way of example, however. The detection optical system can thus also be designed as a finite imaging system without a tube lens system.

A control unit may be provided in order to synchronize the scanning element included in the transport optical system and the image capture by means of the detector. Said control unit is preferably designed to also control the light source and to synchronize it with the image capture and the scanning element. In one embodiment in which the light sheet is generated by means of a further scanning element included in the illumination optical system, the control unit is preferably also designed to also synchronize said scanning element with the remaining system components.

The light sheet microscope according to an embodiment of the invention is preferably designed such that the main beam of the detection optical system is transmitted by the transport optical system. This makes it possible to achieve high light efficiency.

When selecting the numerical aperture of the detection optical system, symmetrical illumination of the pupil of the detection objective and thus symmetrical point spread function (PSF) on the camera sensor may be selected. Alternatively, the aperture of the detection optical system may also be maximized, which leads to asymmetrical PSF on the detector, but brings about higher light efficiency of the optical system.

In a further embodiment, the detection optical system includes a zoom system such that said detection optical system has a magnification adjustment option that is separate from the detection objective. For example, the above-mentioned tube lens system may be designed as a zoom system. It is also possible, however, to arrange a changeover system for afocal magnification systems in the infinite beam path of the detection optical system. A changeover system for the tube lens system is also conceivable for the mentioned purpose.

In the infinite beam path of the detection optical system, manipulation systems may be coupled, as are known from conventional microscopes, typically in an incident illumination beam path in this case. Said manipulation systems allow manipulation directly in the imaged plane while the manipulated light is being imaged into the sample by means of the transport optical system. Examples of manipulation systems of this kind are scanning systems, such as digital micromirror devices (DMD).

The light sheet microscope according to an embodiment of the invention may optionally be implemented as a stand-alone system or as a module for a conventional microscope, e.g. an upright microscope, an inverted microscope or a fixed-stage microscope. If the light sheet microscope is implemented as a module for a conventional microscope, one or more parts of the transport optical system, e.g. the sample-facing objective, a tube lens system and/or an ocular lens system, may be part of the microscope.

FIG. 1 is a schematic view of the structure of a light sheet microscope 10, which is used for volume imaging in the manner of an oblique plane microscope.

The light sheet microscope 10 comprises an illumination optical system 12, a transport optical system 14 and a detection optical system 16, the optical axes $O_1$, $O_2$ and $O_3$ of which converge, i.e. intersect one another, in an intermediate image space labeled 18 in FIG. 1. The illumination optical system 12 is used to focus the illumination light 22, supplied to said illumination optical system by a light source 20, into the intermediate image space 18 so as to generate an illumination light distribution here in the manner of a light sheet. Said light sheet generated in the intermediate image space 18 is then imaged into a sample by means of the transport optical system 14 such that a region of the sample is illuminated by the light sheet and is excited so as to emit fluorescent radiation. The fluorescent radiation emitted by the sample in turn reaches the transport optical system 14, which thus images the sample region illuminated by the light sheet as an intermediate image into the intermediate image space 18. The intermediate image of the illuminated sample region that is generated in the intermediate image space 18 is lastly imaged onto a detection surface 28 of a detector 30 by means of the detection optical system 16.

One after the other in the direction of propagation of the illumination light 22 emitted by the light source 20, the illumination optical system 12 includes a cylindrical lens 32, a first adjustment element 34, an ocular lens system 36, a second adjustment element 38, a tube lens element 40, and an illumination objective 42 that faces the intermediate image space 18. In the embodiment in FIG. 1, the cylindrical lens 32 and the illumination objective 42 are part of an anamorphic optical system which has the function of generating, from the illumination light 22 emitted by the light source 20, the light sheet in the desired shape in the intermediate image space 18. In the process, the cylindrical lens 32 focuses the illumination light 22 into the image of the pupil of the illumination objective 42, which image is generated by the ocular lens system 36 and the tube lens system 40. In the embodiment in FIG. 1, the tube lens system 40 and the ocular lens system 36 therefore form a Galilean telescope having an actual intermediate image. It should be noted, however, that the implementation of the anamorphic system selected in the embodiment in FIG. 1 should be understood to be given merely by way of example. It is thus also possible, for example, in particular in the case of smaller numerical apertures, to use only the cylindrical lens 32 to form the light sheet, without the illumination objective 42.

The two adjustment elements 34 and 38 included in the illumination optical system 12 form an adjustment device that allows the light sheet to be adjusted relative to the detection surface 28 of the detector 30 or, to be specific, relative to the image of the detection surface 28, which image is generated in the intermediate image space 18 by the detection optical system 16 and on which image the light sheet is superimposed. The adjustment element 38 is arranged here in a plane that is conjugate with an image plane of the illumination objective 42. When the adjustment element 38 is tilted, the angle at which the illumination light 22 exits the illumination objective 42 is thus changed. The adjustment element 34 is arranged in a plane that is conjugate with a pupil plane of the illumination objective 42. The adjustment element 34 thus makes it possible to set the position of the illumination light 22 exiting the illumination objective 42. The two adjustment elements 34 and 38 thus allow the position and angle of the light sheet to be adjusted independently of one another.

For the light sheet generation, the illumination optical system 12 may include further elements, for example a field stop and/an aperture stop. In this case, the field stop has the function of limiting the light sheet in the direction in which it extends. By contrast, the aperture stop is used to limit the aperture angle at which the light sheet is focused.

The transport optical system 14 includes an objective 44, which faces the sample, a tube lens system 46, an ocular lens system 48, a scanning element 50, an ocular lens system 52, a tube lens system 54, a deflection element 26, an afocal system 58 and an intermediate imaging objective 56, in this sequence starting from the object. The objective 44 forms the only sample-facing objective of the light sheet microscope 10.

The transport optical system 14 is designed as an optical system that is telecentric on both sides. The afocal system 58 included in the transport optical system 14 is used to carry out the magnification adjustment to the refractive index ratio between the sample space and the intermediate image space 18, as is required for the desired volume image transport.

The scanning element 50, which is designed, for example, as a galvanometer mirror or MEMS mirror, allows the sample to be scanned laterally by the light sheet, i.e. transversely to the optical axis of the objective 44. For this purpose, the scanning element 50 is arranged between the two ocular lens systems 48 and 52 at a location at which an actual image of the pupil of the transport optical system 14 is generated by means of the ocular lens systems 48 and 52.

The detection optical system 16 includes a detection object 60, which faces the intermediate image space 18, and a tube lens system 62. By means of the detection objective 60 and the tube lens system 62, the intermediate image of the sample region illuminated by the light sheet, said image being generated in the intermediate image space by the transport optical system 14, is imaged onto the detector surface 28 of the detector 30.

The light sheet microscope 10 further comprises a control unit 64, which controls the light source 20, the detector 30 and the scanning element 50. In particular, the control unit 64 ensures that the light source 20, the detector 30 and the scanning element 50 are operated in synchrony with one another. The control unit 64 thus ensures, for example, that the tilting of the scanning element 50, and thus the lateral scanning movement of the light sheet, is synchronized with the image capture by the detector 30. The light source 20 can also be operated in synchrony by means of the control unit 64, e.g. by the illumination light being switched off during a return movement of the scanning element 50 and/or during a read time of the detector 30. Of course, these synchronizing control processes are understood to be given merely by way of example.

Since the illumination optical system 12, the transport optical system 14 and the detection optical system 16 are aligned with one another in the light sheet microscope 10 in FIG. 1 such that the optical axes $O_1$, $O_2$ and $O_3$ of said systems converge in the intermediate image space 18, the illumination light 22 generated by the light source 20 is coupled into the transport optical system 14, so to speak, by means of a geometric combination in the region of the intermediate image, and this allows dichroic beam splitters in the region of the transport optical system 14 to be dispensed with. It is thus possible to reliably prevent a degree of pupil offset that will compromise the imaging performance of the transport optical system 14.

Figure 2:
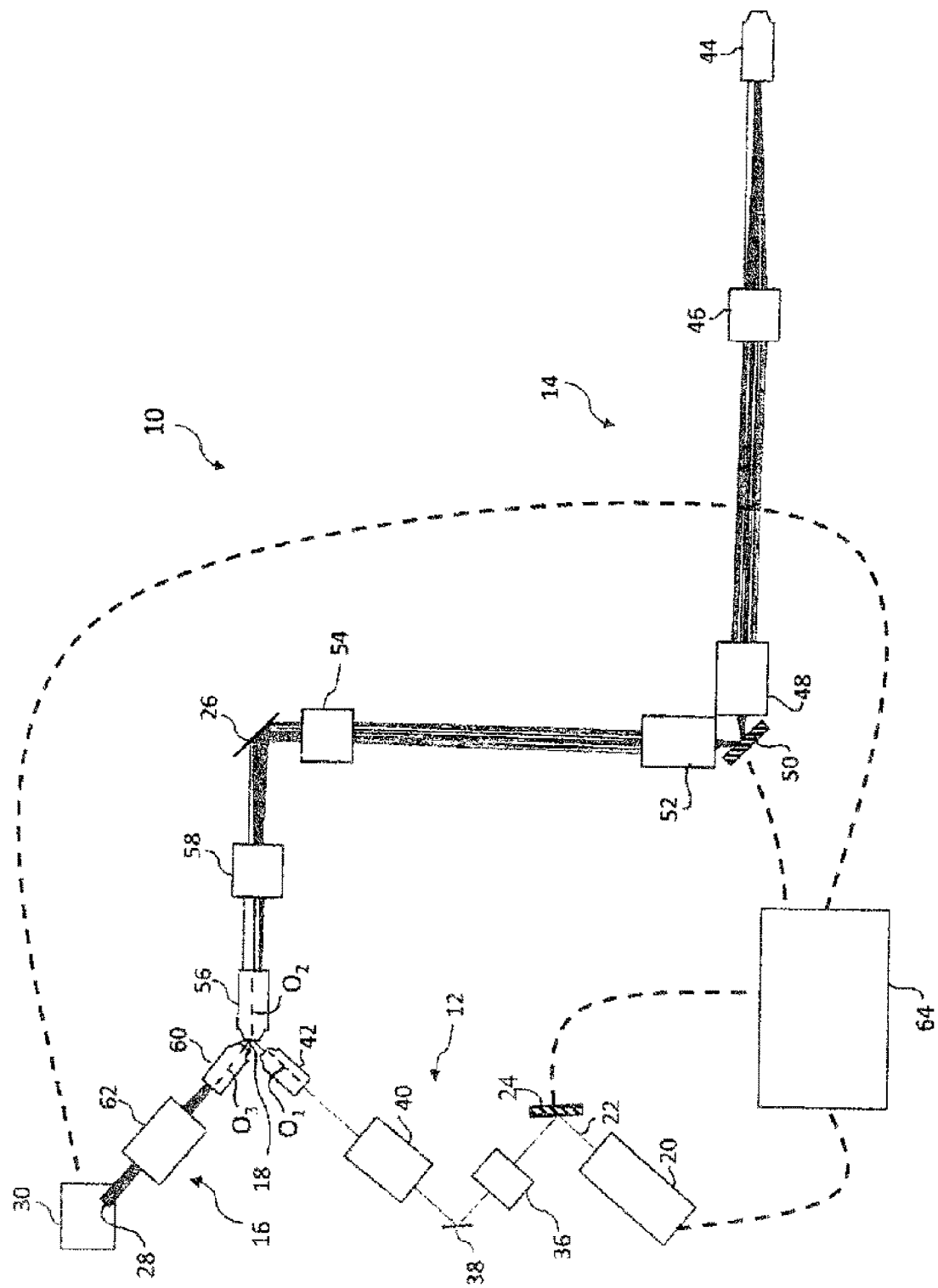
FIG. 2 shows a modified embodiment of the light sheet microscope as a second embodiment.

FIG. 2 shows a modification to the light sheet microscope 10 shown in FIG. 1, as a second embodiment. This modification consists merely in that a further scanning element 24 is provided in the illumination optical system 12, in place of the cylindrical lens 32 used to generate the light sheet in the first embodiment. The scanning element 24, which is a galvanometer mirror or an MEMS mirror, for example, is arranged in the illumination optical system 12 at the location at which the adjustment element 34 is positioned in the first embodiment. The scanning element 24 brings about a scanning movement of the illumination light, by means of which movement the desired light sheet is built up sequentially. In the process, the control unit 64 ensures in turn that the operation of the scanning element 24 is synchronized with the other system components, in particular with the scanning element 50 included in the transport optical system 14, and with the detector 30.

Figure 3:
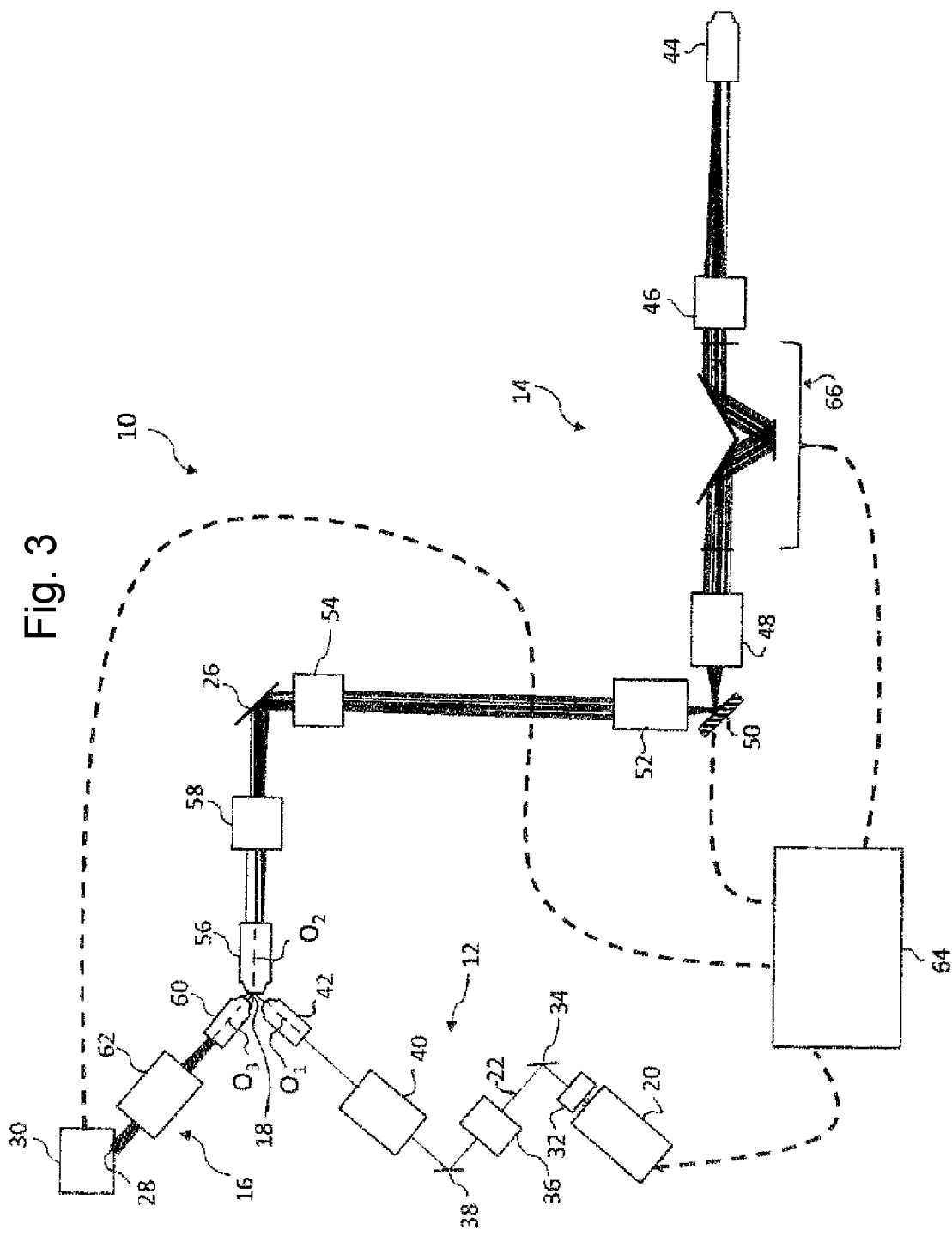
FIG. 3 shows a further modified embodiment of the light sheet microscope as a third embodiment.

FIG. 3 shows a further modification to the light sheet microscope 10 in FIG. 1, as a third embodiment. The third embodiment includes an image rotation unit 66, which is designed as an Abbe-König rotator, for example, in the transport optical system 14 between the objective 44 and the scanning element 50. The image rotation unit 66 is used to vary the azimuth of the tilting of the light sheet imaged into the sample, which tilting is defined by the selected geometry of the optical arrangement within the light sheet microscope 10, as desired. The image rotation unit 66 can also be controlled in synchrony with the other system components by means of the control unit 64.

According to an embodiment, the image rotation element 66 shown in FIG. 3 can also be used in the second embodiment in FIG. 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 light sheet microscope
12 illumination optical system
14 transport optical system
16 detection optical system
18 intermediate image space
20 light source
22 illumination light
24 scanning element
26 deflection element
28 detection surface
30 detector
32 cylindrical lens
34 adjustment element
36 ocular lens system
38 adjustment element
40 tube lens system
42 illumination objective
44 sample-facing objective
46 tube lens system
48 ocular lens system
50 scanning element
52 ocular lens system
54 tube lens system
56 intermediate imaging objective
58 afocal system
60 detection objective
62 tube lens system
64 control unit
66 image rotation unit
$O_1$ optical axis of the illumination optical system
$O_2$ optical axis of the transport optical system
$O_3$ optical axis of the detection optical system

The invention claimed is:

1. A light sheet microscope, comprising:
an illumination optical system configured to generate a light sheet in an intermediate image space;
a transport optical system, which is telecentric on both an object side and an image side, configured to image the light sheet generated in the intermediate image space into a sample and to image a region of the sample illuminated by the light sheet as an intermediate image into the intermediate image space;
a detection optical system configured to image the intermediate image generated in the intermediate image space onto a detector, the optical axes of the illumination optical system, the transport optical system and the detection optical system intersecting one another in the intermediate image space; and
a scanning element, which is arranged in the transport optical system and through which the light sheet is moveable in the sample transversely to the optical axis of the transport optical system.

2. The light sheet microscope according to claim 1, wherein the transport optical system is configured to position the light sheet in the sample obliquely to the optical axis of the transport optical system.

3. The light sheet microscope according to claim 1, wherein the transport optical system is free of beam splitters.

4. The light sheet microscope according to claim 1, wherein the scanning element is arranged within the transport optical system at a location of an actual pupil image.

5. The light sheet microscope according to claim 1, wherein the transport optical system includes a first objective configured to face the sample, and wherein the light sheet microscope is free of any other sample-facing objective.

6. The light sheet microscope according to claim 5, wherein the transport optical system further includes, arranged in sequence starting from the sample, a first tube lens system, a first ocular lens system, a second ocular lens system, a second tube lens system, and an intermediate imaging objective that faces the intermediate image space.

7. The light sheet microscope according to claim 6, wherein the scanning element is arranged between the first ocular lens system and the second ocular lens system.

8. The light sheet microscope according to claim 1, wherein the transport optical system includes an Abbe-Konig rotator, by which tilting of the light sheet in the sample relative to the optical axis of the transport optical system is adjustable.

9. The light sheet microscope according to claim 1, wherein the illumination optical system includes a telescope system and an illumination objective that faces the intermediate image space.

10. The light sheet microscope according to claim 1, wherein the illumination optical system includes an anamorphic optical system for generating the light sheet in the intermediate image space.

11. The light sheet microscope according to claim 1, wherein the illumination optical system includes a further scanning element for generating the light sheet in the intermediate image space.

12. The light sheet microscope according to claim 1, wherein the illumination optical system includes an adjustment device configured to orient the light sheet relative to a detection surface of the detector.

13. The light sheet microscope according to claim 12, wherein the adjustment device comprises a first adjustment element, which is arranged in a plane that is conjugate with an image plane, and a second adjustment element, which is arranged in a plane that is conjugate with a pupil plane.

14. The light sheet microscope according to claim 1, wherein the transport optical system is configured as a correction optics system that allows adjustment to samples of different refractive indices.

15. The light sheet microscope according to claim 1, wherein the transport optical system extends from an intermediate imaging objective to a sample-facing objective, the intermediate imaging objective being a lens most proximate to the intermediate imaging space and the sample-facing objective being a lens most proximate to the sample.

16. The light sheet microscope according to claim 1, wherein the transport optical system includes an adjustable correction element which is movable so as to correct spherical aberration caused by refractive index mismatching and to change focal distance such that a magnification condition remains fulfilled for different sample-side refractive indices.

17. A method for light-microscopy imaging of a sample, the method comprising:
generating a light sheet in an intermediate image space using an illumination optical system;
imaging the light sheet generated in the intermediate image space into the sample and imaging a region of the sample illuminated by the light sheet as an intermediate image into the intermediate image space using a transport optical system that is telecentric on both an object side and an image side; and
imaging the intermediate image generated in the intermediate image space onto a detector using a detection optical system,
wherein the optical axes of the illumination optical system, the transport optical system and the detection optical system intersect one another in the intermediate image space, and
wherein the light sheet is moved in the sample transversely to the optical axis of the transport optical system using a scanning element arranged in the transport optical system.

18. The light sheet microscope according to claim 1, wherein the transport optical system is free of additional scanning elements such that only a single scanning element is arranged therein.

19. The light sheet microscope according to claim 18, wherein the single scanning element is in a form of a galvanometer mirror or a micro-electromechanical mirror.

20. The light sheet microscope according to claim 18, wherein the single scanning element is disposed at a location of an actual pupil image.

* * * * *